(12) United States Patent
Horowitz et al.

(10) Patent No.: US 7,239,662 B2
(45) Date of Patent: Jul. 3, 2007

(54) SYSTEM AND METHOD FOR VIDEO ERROR CONCEALMENT

(75) Inventors: Michael Horowitz, Austin, TX (US); Rick Flott, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 635 days.

(21) Appl. No.: 10/226,504

(22) Filed: Aug. 23, 2002

(65) Prior Publication Data
US 2003/0039312 A1   Feb. 27, 2003

Related U.S. Application Data

(60) Provisional application No. 60/314,413, filed on Aug. 23, 2001.

(51) Int. Cl.
*H04N 7/12* (2006.01)
*H04B 1/66* (2006.01)
(52) U.S. Cl. .................................. 375/240.24
(58) Field of Classification Search .............. None
See application file for complete search history.

(56) References Cited

U.S. PATENT DOCUMENTS

| | | | | |
|---|---|---|---|---|
| 5,400,076 | A * | 3/1995 | Iwamura | 375/240.15 |
| 5,481,297 | A * | 1/1996 | Cash et al. | 348/14.12 |
| 5,535,275 | A * | 7/1996 | Sugisaki et al. | 380/203 |
| 5,585,930 | A * | 12/1996 | Uchida et al. | 386/40 |
| 5,719,724 | A * | 2/1998 | Kawaguchi | 360/84 |
| 5,724,369 | A | 3/1998 | Brailean et al. | |
| 5,754,553 | A * | 5/1998 | Shimoda | 370/471 |
| 5,835,144 | A | 11/1998 | Matsumura et al. | |
| 6,115,076 | A | 9/2000 | Linzer | |
| 6,124,995 | A * | 9/2000 | Kim | 360/48 |
| 6,154,495 | A * | 11/2000 | Yamaguchi et al. | 375/240.26 |

(Continued)

OTHER PUBLICATIONS

Lidinsky, Bill, "Overview of Video Conferencing," Power Point Presentation, Oct. 16, 1996, HEP Network Resource Center.

(Continued)

*Primary Examiner*—Nhon Diep
(74) *Attorney, Agent, or Firm*—Wong, Cabello, Lutsch, Rutherford, & Brucculeri, LLP

(57) ABSTRACT

The present invention provides, in one embodiment, a system and method for concealing video errors. The system encodes, reorders, and packetizes video information into video data packets for transmission over a communication network such that the system conceals errors caused by lost video data packets when the system receives, depacketizes, orders, and decodes the data packets. In one embodiment, the system and method encodes and packetizes video information, such that adjacent macroblocks are not placed in the same video data packets. Additionally, the system and method may provide information accompanying the video data packets to facilitate the decoding process. An advantage to such a scheme is that errors due to video data packet loss are spatially distributed over a video frame. Thus, if regions of data surrounding a lost macroblock are successfully decoded, the decoder may predict motion vectors and spatial content with a higher degree of accuracy, which leads to higher video quality.

89 Claims, 9 Drawing Sheets

U.S. PATENT DOCUMENTS 6,154,780 A * 11/2000 Zhu ........................... 709/236
6,178,289 B1 * 1/2001 Jang .......................... 386/112
6,233,392 B1 * 5/2001 Comer ........................ 386/68
6,421,385 B1 * 7/2002 Uenoyama et al. ...... 375/240.2
6,639,945 B2 * 10/2003 Chaddha et al. ....... 375/240.23
6,721,362 B2 * 4/2004 Lin et al. ............... 375/240.27
6,754,271 B1 * 6/2004 Gordon et al. ......... 375/240.12

2001/0050955 A1 12/2001 Zhang et al.

OTHER PUBLICATIONS

Drew, Dr. Mark S., "Video Compression," Class Materials, Original Date of Publication Unknown, School of Computing Science at Simon Fraser University, available at: http://www.cs.sfu.ca/CourseCentral/365/li/material/notes/Chap4/Chap4.3/Chap4.3.html.

* cited by examiner

| Format | Resolution (pixels/line x lines/frame) | Bit Rate at 30 fps (Mbps) |
|---|---|---|
| SQCIF (Sub Quarter CIF) | 128 x 96 | 4.4 |
| QCIF (Quarter CIF) | 176 x 144 | 9.1 |
| CIF (Full CIF, FCIF) | 352 x 288 | 36.5 |
| 4CIF (4 x CIF) | 704 x 576 | 146.0 |
| 16CIF (16 x CIF) | 1408 x 1152 | 583.9 |

FIG. 1

Prior Art

SYSTEM AND METHOD FOR VIDEO ERROR CONCEALMENT

CROSS REFERENCE TO RELATED APPLICATION

This application claims the benefit of Provisional Patent Application Ser. No. 60/314,413, filed Aug. 23, 2001, entitled "System and Method for Video Error Concealment," which is incorporated herein by reference.

BACKGROUND OF THE INVENTION

1. Field of the Invention

This present invention relates generally to video communication, and more particularly to video error concealment.

2. Description of Related Art

Video images have become an increasingly important part of global communication. In particular, video conferencing and video telephony have a wide range of applications such as desktop and room-based conferencing, video over the Internet and over telephone lines, surveillance and monitoring, telemedicine, and computer-based training and education. In each of these applications, video and accompanying audio information is transmitted across telecommunication links, including telephone lines, ISDN, DSL, and radio frequencies.

A standard video format used in video conferencing is Common Intermediate Format (CIF), which is part of the International Telecommunications Union (ITU) H.261 videoconferencing standard. The primary CIF format is also known as Full CIF or FCIF. Additional formats with resolutions higher and lower than FCIF have also been established. FIG. 1 is a table of the resolution and bit rate requirements for various video formats under the assumption that 12 bits are required to represent one pixel, according to the prior art The bit rates (in megabits per second, Mbps) shown are for uncompressed color frames.

Presently, efficient transmission and reception of video signals may require encoding and compression of video and accompanying audio data. Video compression coding is a method of encoding digital video data such that it requires less memory to store the video data and reduces required transmission bandwidth. Certain compression/decompression (CODEC) schemes are frequently used to compress video frames to reduce required transmission bit rates. Thus, CODEC hardware and software allow digital video data to be compressed into a smaller binary format than required by the original (i.e., uncompressed) digital video format.

Several conventional approaches and standards to encoding and compressing source video signals exist. Some standards are designed for a particular application such as JPEG (Joint Photographic Experts Group) for still images, and H.261, H.263, MPEG (Moving Pictures Experts Group), MPEG-2 and MPEG-4 for moving images. These coding standards, typically, use block-based motion-compensated prediction on 16×16 pixels, commonly referred to as macroblocks. A macroblock is a unit of information containing four 8×8 blocks of luminance data and two corresponding 8×8 blocks of chrominance data in accordance with a 4:2:0 sampling structure, where the chrominance data is sub-sampled 2:1 in both vertical and horizontal directions.

As a practicality, audio data also must be compressed, transmitted, and synchronized along with the video data. Synchronization, multiplexing, and protocol issues are covered by standards such as H.320 (ISDN-based video conferencing), H.324 (POTS-based video telephony), and H.323 (LAN or IP-based video conferencing). H.263 (or its predecessor, H.261) provides the video coding part of these standards groups.

A motion estimation and compensation scheme is one conventional method typically used for reducing transmission bandwidth requirements for a video signal. Because the macroblock is the basic data unit, the motion estimation and compensation scheme may compare a given macroblock in a current video frame with the given macroblock's surrounding area in a previously transmitted video frame, and attempt to find a close data match. Typically, a closely matched macroblock in the previously transmitted video frame is spatially offset from the given macroblock by less than a width of the given macroblock. If a close data match is found, the scheme subtracts the given macroblock in the current video frame from the closely matched, offset macroblock in the previously transmitted video frame so that only a difference (i.e., residual) and the spatial offset needs to be encoded and transmitted. The spatial offset is commonly referred to as a motion vector. If the motion estimation and compensation process is efficient, the remaining residual macroblock should contain only an amount of information necessary to describe data associated with pixels that change from the previous video frame to the current video frame and a motion vector. Thus, areas of a video frame that do not change (e.g., the background) are not encoded and transmitted.

Conventionally, the H.263 standard specifies that the motion vectors used for motion estimation and motion compensation be differentially encoded. Although differential encoding reduces data amounts required for transmission, any error in which motion vector data is lost or corrupted for one macroblock negatively impacts adjacent macroblocks. The result is a propagation of error due to the corrupted data which leads to lower video quality.

When preparing video frame information for transmission over a packet switched communication network, encoding schemes transform the video frame information, compressed by motion estimation and compensation techniques, into data packets for transmission across a communication network. Although data packets allow for greater transmission efficiency, lost, corrupted, or delayed data packets can also introduce errors resulting in video quality degradation. Alternatively, video data may be transmitted on heterogeneous communications networks in which one of the endpoints is associated with a circuit-switched network and a gateway or other packet-switched to circuit switched network bridging device is used.

Currently, lost or corrupted data packets often cause reduced video quality. Therefore, there is a need for a system and method which organizes and transmits data packets in order to conceal errors caused by data packet loss.

SUMMARY OF THE INVENTION

The present system and method overcome or substantially alleviate prior problems associated with packet loss of video data. In general, the present invention provides a system and method that encodes, reorders, and packetizes video information for transmission across a packet switched network with a capability to conceal video error caused by video data packet loss.

In an exemplary embodiment, video signals are encoded into sets of macroblocks. A macroblock reordering engine then assigns integer labels called macroblock group identifiers (MBGIDs) to each macroblock. Advantageously, adjacent macroblocks are not assigned identical MBGIDs in one exemplary embodiment. A macroblock packetization engine then enables packetizing of the macroblocks, such that macroblocks assigned identical MBGIDs are packetized together. For embodiments of the invention in which adjacent macroblocks are not assigned identical MBGIDs, it follows that spatially adjacent macroblocks are not packetized together. Additionally, corresponding data, such as an intra-macroblock map, may be incorporated in a picture header or conveyed by some other mechanism to facilitate a corresponding decoding process.

In yet another embodiment of the invention, when an image processing engine receives data packets containing encoded macroblocks, the data packets are depacketized, and the encoded macroblocks are ordered and decoded. In an alternate embodiment, the image processing engine depacketizes the received data packets, then decodes the macroblocks in an order in which they were received to reduce processing delay. If one or more data packets are lost, data accompanying the macroblocks of successfully transmitted data packets are used to attenuate effects of the lost data packets. Various methods based on whether the lost macroblocks were intra-coded or inter-coded compensate for the missing macroblocks. Upon compensation, the video signal may then be displayed. As a result, the present system and method is capable of concealing video errors resulting from data packet loss.

BRIEF DESCRIPTION OF THE DRAWINGS

FIG. 1 is a table of the resolution and bit rate requirements for various video formats, according to the prior art;

FIG. 5 is an exemplary diagram of a macroblock reorder pattern for a QCIF formatted video frame, where each number is an MBGID assigned to a macroblock in a corresponding spatial location;

FIG. 6 is an exemplary diagram of the QCIF frame macroblock reorder pattern of FIG. 5, where a data packet containing coded macroblock data for macroblocks with MBGID=5 is lost;

DETAILED DESCRIPTION OF THE DRAWINGS

The present invention conceals errors in video signals caused by data packet loss. The present system and method departs from existing technologies by packetizing macroblocks in a flexible (e.g., non-raster-scan) order in a video frame. In contrast to existing video coding standards, macroblocks are packetized in an order specified by a macroblock reorder pattern. In addition, motion vectors for each macroblock may be non-differentially encoded. These improvements seek to attenuate the disturbances caused by data packet loss across a communication link. The scope of the present invention covers a variety of video standards, including, but not limited to, H.261, H.263, H.264, MPEG, MPEG-2, and MPEG-4.

Figure 2:
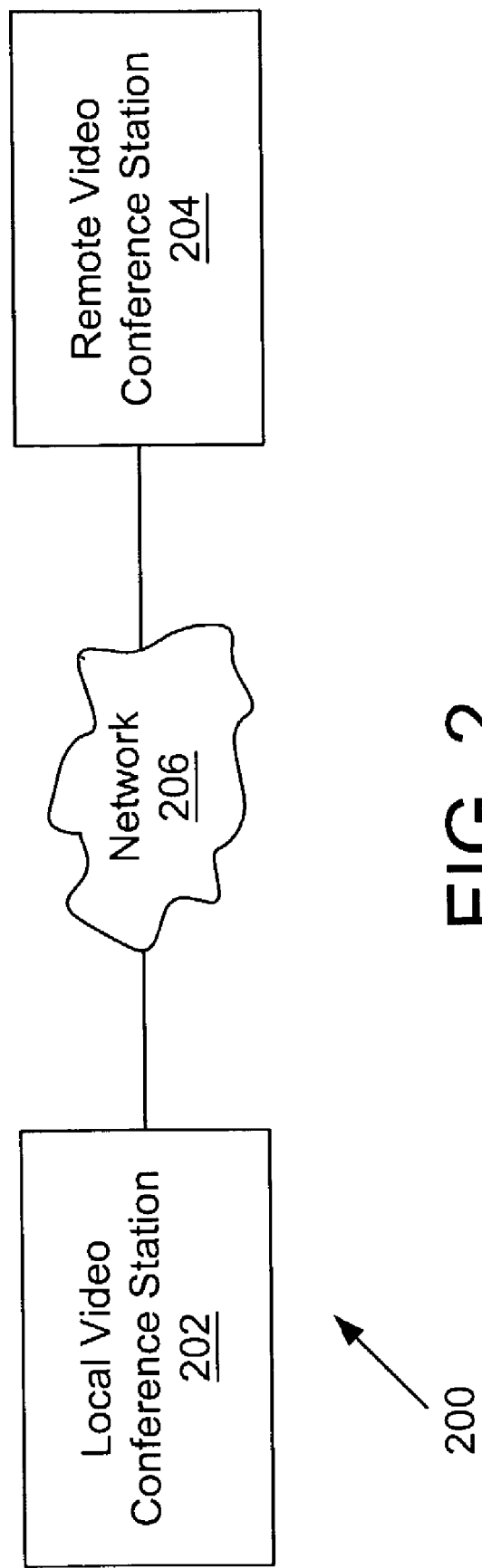
FIG. 2 is a block diagram of an exemplary video conferencing system, according to the present invention.

FIG. 2 illustrates an exemplary video conferencing system 200. The video conferencing system 200 includes a local video conference station 202 and a remote video conference station 204 connected through a network 206. Although FIG. 2 only shows two video conference stations 202 and 204, those skilled in the art will recognize that more video conference stations may be coupled to the video conferencing system 200. It should be noted that the present system and method may be utilized in any communication system where video data is transmitted over a network. The network may be any type of electronic transmission medium, such as, but not limited to, POTS, cable, fiber optic, and radio transmission media.

Figure 3:
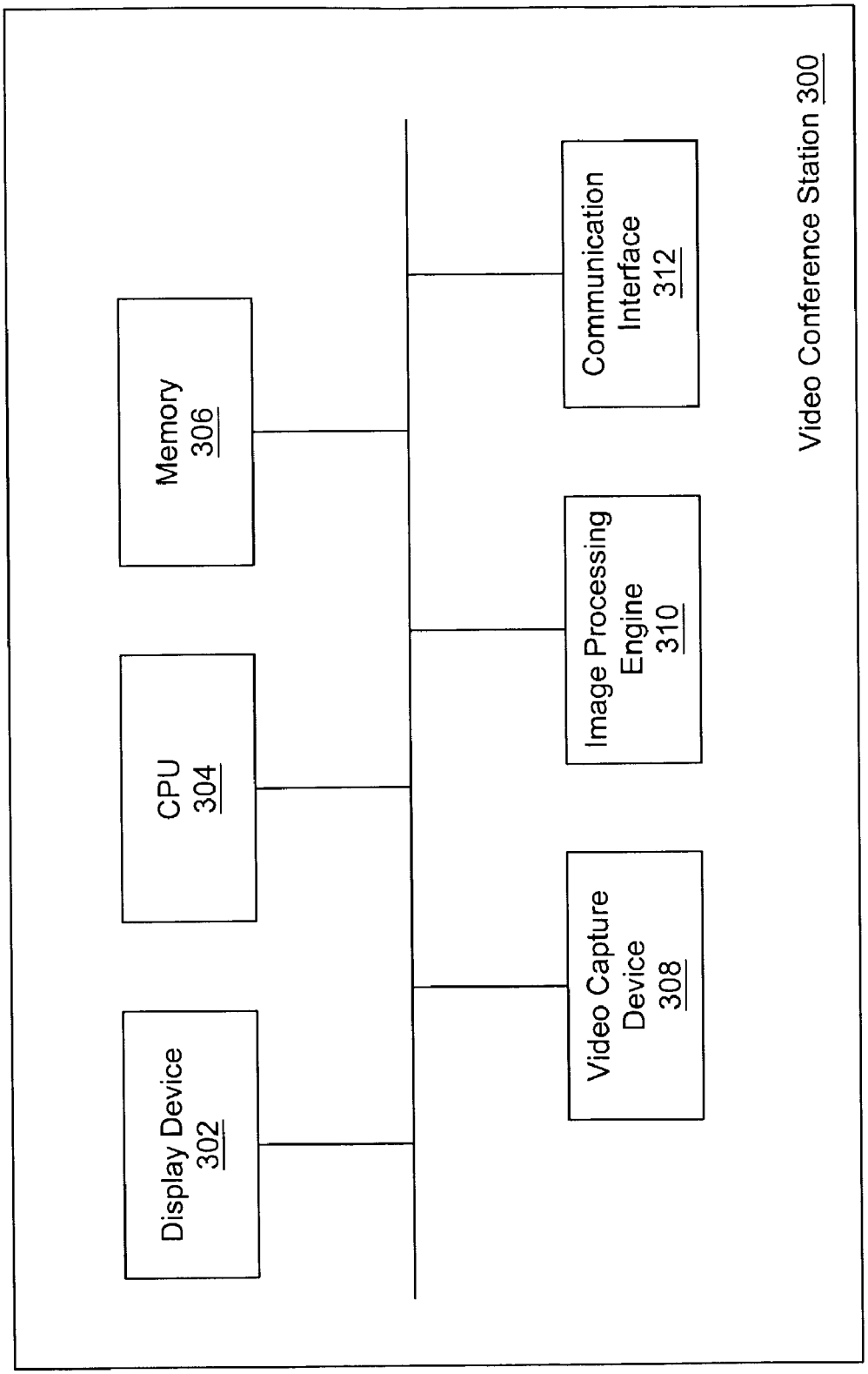
FIG. 3 is a block diagram of an exemplary video conference station of the video conferencing system of FIG. 2.

FIG. 3 is a block diagram of an exemplary video conference station 300. For simplicity, the video conference station 300 will be described as the local video conference station 202 (FIG. 2), although the remote video conference station 204 (FIG. 2) may contain a similar configuration. In one embodiment, the video conference station 300 includes a display device 302, a CPU 304, a memory 306, at least one video capture device 308, an image processing engine 310, and a communication interface 312. Alternatively, other devices may be provided in the video conference station 300, or not all above named devices provided. The at least one video capture device 308 may be implemented as a charge coupled device (CCD) camera, a complementary metal oxide semiconductor (CMOS) camera, or any other type of image capture device. The at least one video capture device 308 captures images of a user, conference room, or other scenes, and sends the images to the image processing engine 310. Typically, the image processing engine 310 processes the video image into data packets before the communication interface 312 transmits the data packets to the remote video conference station 204. The image processing engine 310 will be discussed in more detail in connection with FIG. 4. Conversely, the image processing engine 310 also transforms received data packets from the remote video conference station 204 into a video signal for display on the display device 302.

Figure 4:
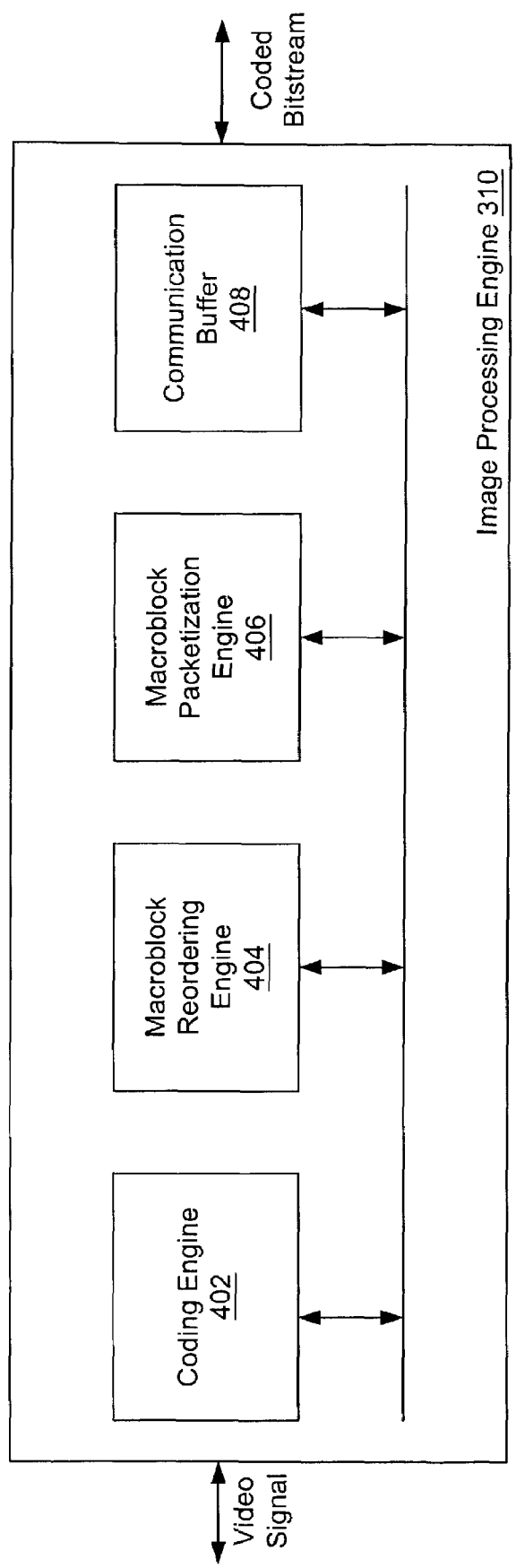
FIG. 4 is a block diagram of an exemplary embodiment of the image processing engine of FIG. 3.

FIG. 4 is an exemplary embodiment of the image processing engine 310 of FIG. 3. The image processing engine 310 includes a coding engine 402, a macroblock reordering engine 404, a macroblock packetization engine 406, and a communication buffer 408. Initially, a video signal from the video capture device 308 (FIG. 3) enters the coding engine 402, which converts each frame of video into a desired format, and transforms each frame of the video signal into a set of macroblocks. A macroblock is a data unit that contains blocks of data comprising luminance and chrominance components associated with picture elements (also referred to as pixels). For example, in H.263, a macroblock consists of four 8×8 blocks of luminance data and two corresponding 8×8 blocks of chrominance data in a 4:2:0 chroma sampling format. An 8×8 block of data is an eight-column by eight-row matrix of data, where each data corresponds to a pixel of the video frame. A 4:2:0 chroma formatted macroblock comprises data covering a 16 pixel by 16 pixel section of the video frame. However, the present invention is not limited to macroblocks as conventionally defined, but may be extended to any data unit comprising luminance and/or chrominance data. In addition, the scope of the present invention covers other sampling formats, such as a 4:2:2 chroma sampling format comprising four 8×8 blocks of luminance data and four corresponding 8×8 blocks of chrominance data, or a 4:4:4 chroma sampling format comprising four 8×8 blocks of luminance data and eight corresponding 8×8 blocks of chrominance data.

In addition, the coding engine 402 encodes (i.e., compresses) each macroblock to reduce the number of bits used to represent data content. Each macroblock may be "intra-coded" or "inter-coded," and a frame may be comprised of any combination of intra-coded and inter-coded macroblocks. Inter-coded macroblocks are encoded using temporal similarities (i.e., similarities that exist between a macroblock from one frame and a closely matched macroblock from a previous frame). Specifically, a given inter-coded macroblock comprises encoded differences between the given macroblock and a closely matched macroblock from a previous video frame. The closely matched macroblock from the previous video frame may comprise data associated with pixels that are offset from the pixels associated with the given macroblock. Alternatively, intra-coded macroblocks are encoded without use of information from other video frames in a manner similar to that employed by the JPEG still image encoding standard.

For example, to determine if a given macroblock may be encoded as an inter-coded macroblock, the coding engine 402 computes differences between data of the given macroblock of a current video frame with data of a macroblock from a previous video frame (referred to as an offset macroblock), where the differences may be realized, for example, by a mean-absolute error or a mean-squared error between data corresponding to pixels located at co-located positions within the macroblocks. For the given macroblock, the coding engine 402 computes errors for a plurality of offset macroblocks. If the coding engine 402 only finds errors greater than a predetermined difference threshold value, then significant similarities do not exist between data from the given macroblock and data from the previous frame, and the macroblock is intra-coded. However, if one error is found to be less than the predetermined difference threshold value for the given macroblock and a given offset macroblock from the previous frame, then the given macroblock is inter-coded.

To inter-code the given macroblock, the coding engine 402 subtracts the given macroblock's data from the offset macroblock's data (i.e., luminance and chrominance data associated with a pixel of the given macroblock is subtracted from luminance and chrominance data associated with a corresponding pixel of the offset macroblock for every pixel) to give difference data, encodes the difference data using standard coding techniques such as Discrete Cosine Transforms and quantization methods among others, determines an offset vector from the given macroblock to the offset macroblock (referred to as a motion vector), and encodes the motion vector.

Presently, video coding standards, such as H.261 and H.263, specify that motion vectors of inter-coded macroblocks be differentially encoded to improve coding efficiency. However, differential encoding causes errors created by lost or corrupted motion vector data to propagate to adjacent macroblocks that would otherwise be decoded without error, since encoded motion vector data associated with a given macroblock is, in general, not independent of the motion vector data of neighboring macroblocks. Thus, the effects of the motion vector data of a given macroblock are not spatially localized to the given macroblock. However, if the motion vectors of each inter-coded macroblock are non-differentially encoded, then the effects of the motion vector data are localized to the given macroblock, resulting in a significant increase in error resilience. In most cases, a change in motion vector coding method from a differential to a non-differential technique results in a small loss in overall coding efficiency (typically less than a few percent). Advantageously, the motion vector components associated with each inter-coded macroblock, contrary to conventional methods, are not differentially encoded, according to one embodiment of the present invention.

In another embodiment of the invention, the coding engine 402 may intra-code macroblocks of a frame using a "walk-around-refresh" mechanism. The "walk-around-refresh" mechanism is a deterministic mechanism to clean up reference frame mismatches, called data drift, by intra-coding a specific pattern of macroblocks for each frame. The coding engine 402 uses macroblocks of a reference frame as offset macroblocks in decoding inter-coded macroblocks of a current frame. In one embodiment of the invention, the "walk-around-refresh" mechanism is enabled to intra-code a pattern of macroblocks using an integer walk-around interval w selected from a set of predetermined integer walk-around intervals. For example, if w=47, then the coding engine 402 intra-codes every $w^{th}$ macroblock. The walk-around interval may be selected based upon video data transmission rates and error rates. When the "walk-around-refresh" intra-coded macroblocks are received by the coding engine of the remote video conference station 204 (FIG. 2), these "walk-around-refresh" intra-coded macroblocks replace corresponding macroblocks from previous frames that may be corrupted due to video data transmission errors. Any macroblock that may be corrupted due to video data transmission errors (and is not replaced) further propagates and possibly magnifies data drift when the coding engine of the remote video conference station 204 uses the corrupted macroblocks as reference macroblocks for decoding other received macroblocks. Thus, the "walk-around-refresh" intra-coded macroblocks provide the coding engine of the remote video conference station 204 with a "fresh" set of intra-coded macroblocks to be used as reference macroblocks, thereby reducing the propagation of data drift.

Furthermore, the coding engine 402 may generate an intra-macroblock map that identifies which macroblocks in a coded video frame are intra-coded. After the intra-macroblock map is generated, the image processing engine 310 sends the map to the remote video conference station 204. The map may be sent as part of a picture header field associated with the coded video frame, for example, although other fields may be used.

According to the present invention, the coding engine 402 may generate the intra-macroblock map in one of two ways. In one embodiment of the invention, the coding engine 402 uses run-length encoding to describe locations of intra-coded macroblocks within the frame. Run-length encoding is a technique to reduce the size of a repeating string of characters. In another embodiment of the invention, the coding engine 402 generates a bitmap, where each bit in the bitmap corresponds to one macroblock of the frame. A bit's value identifies a corresponding macroblock's coding type. For example, in one embodiment of the invention, a "1" bit signifies that a corresponding macroblock is intra-coded. In another embodiment of the invention, a "1" bit signifies that the corresponding macroblock is inter-coded. Other methods for generating the intra-macroblock map may be contemplated for use in the present invention.

In yet another embodiment of the invention, the coding engine 402 selects the intra-macroblock map coding method that produces the fewest number of bits. For example, a 352×288 pixel (i.e., a 352 pixel horizontal resolution by 288 pixel vertical resolution) FCIF video frame comprises 396 macroblocks configured as a 22×18 macroblock matrix. Not including any bit overhead that may be required, the bitmap encoding method requires 396 bits (one bit for each macroblock). Thus, 396 bits are used to transmit the bitmap encoded intra-macroblock map, independent of the number of intra-coded macroblocks within the FCIF frame. In contrast, however, the number of bits utilized to transmit the run-length encoded intra-macroblock map is dependent upon the number of intra-coded macroblocks within the FCIF frame. The cost of transmitting a run-length encoded intra-macroblock map is eight bits per intra-coded macroblock (i.e., eight bits per run value), where the run value identifies a location of the intra-coded macroblock within the FCIF frame. Therefore, if the FCIF frame contains n intra-coded macroblocks, then 8n bits are required to transfer the run-length encoded intra-macroblock map.

Thus, if the CIF frame contains less than 50 intra-coded macroblocks (n<50), then the source coding engine 402 selects the run-length encoding method, otherwise the source coding engine 402 selects the bitmap encoding method. The selection of an intra-macroblock map encoding method depends upon the video format, of which the FCIF video frame is an exemplary example.

Subsequently, the encoded macroblocks are forwarded to the macroblock reordering engine 404. The macroblock reordering engine 404 reorders the encoded macroblocks. Specifically, each macroblock is assigned a macroblock group identifier (MBGID) from a plurality of MBGIDs. In an exemplary embodiment, the macroblocks are numbered one to six according to an exemplary macroblock assignment pattern illustrated in FIG. 5 for a QCIF formatted frame having nine rows of eleven macroblocks per row. The maximum MBGID is referred to as a maximum group identifier (MGID). In the FIG. 5 exemplary embodiment, MGID=6. As shown, the MBGIDs are assigned in a manner so as to minimize adjacent macroblocks being assigned the same MBGID. Alternatively, other assignment patterns may assign the same MBGID to adjacent macroblocks or in any other assignment order.

Figures 5, 6:
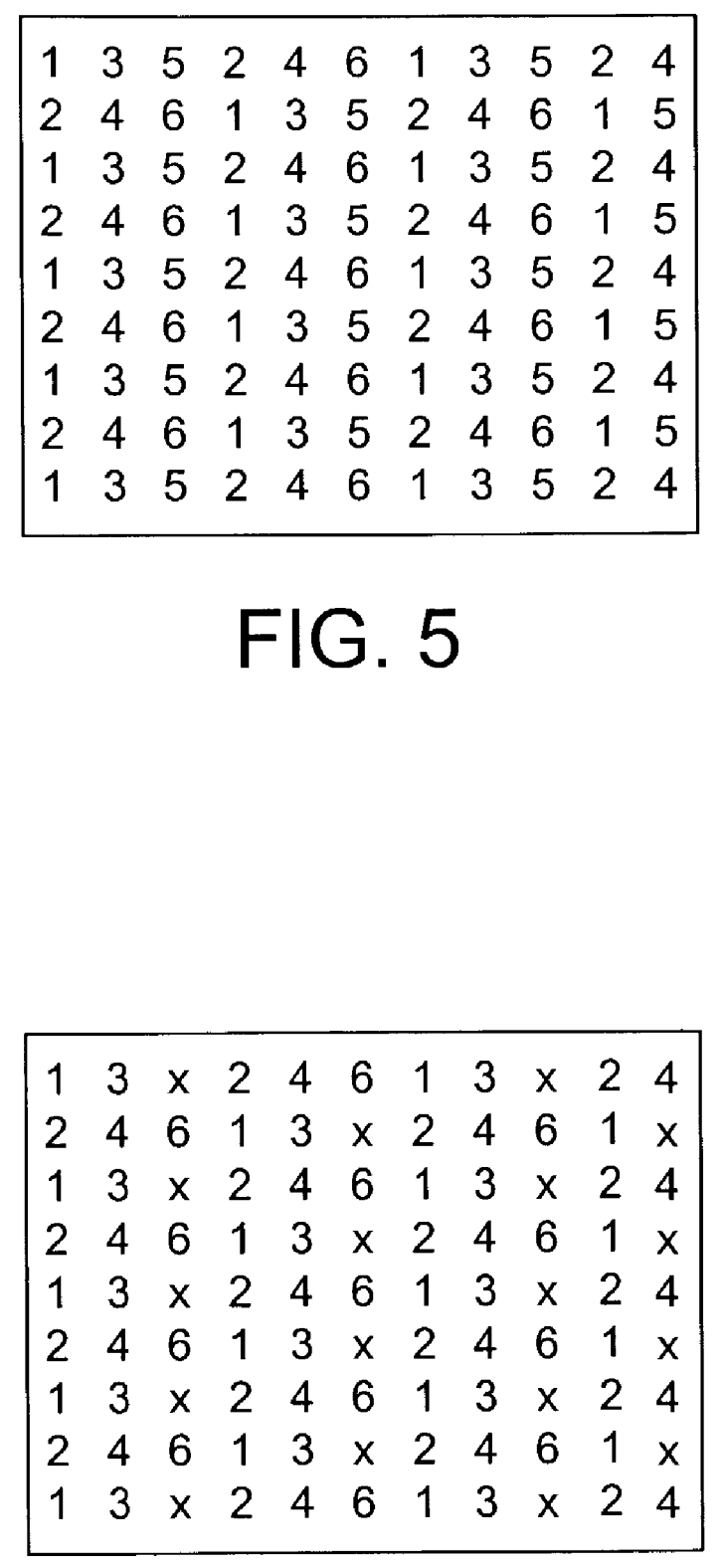

As will be discussed further below in conjunction with FIG. 6, the assigning of macroblocks, whereby adjacent macroblocks are not assigned the same MBGID, advantageously minimizes a concentration of errors in one region of a frame because macroblocks of a lost data packet are spatially distributed across the frame. Since errors due to lost packets are less likely to be concentrated in one region of the frame, lost data associated with lost macroblocks may be more accurately reconstructed using data from neighboring macroblocks. In other words, spatial interpolation of data from neighboring macroblocks or an estimation of a missing macroblock's motion vectors are more accurately determined, if the loss of data is not spatially localized within the frame.

The coding engine 402 (FIG. 4) of the image processing engine 310 (FIG. 3) of the remote video conference station 204 (FIG. 2) may use a variety of error concealment techniques in conjunction with the reordering of macroblocks to improve video quality. For example, in one embodiment of the invention, the coding engine 402 decodes the neighboring macroblocks of a lost inter-coded macroblock, estimates a motion vector of the lost macroblock, and then uses the estimated motion vector to reconstruct data of the lost macroblock. In another embodiment of the invention, the coding engine 402 may decode the neighboring macroblocks of a lost intra-coded macroblock, and spatially interpolate the decoded neighboring data to reconstruct the lost data. The scope of the present invention covers other error concealment techniques used in conjunction with macroblock reordering to improve video quality due to lost or corrupted macroblocks.

Different reorder patterns and MBGIDs may be utilized according to the present invention. In one embodiment of the invention, the macroblock reordering engine 404 selects a MGID based on video data rates and/or video format.

Referring back to FIG. 4, once the macroblocks have been assigned MBGIDs, the macroblock packetization engine 406 places the macroblocks into discrete data packets according to their MBGIDs. Thus, macroblocks with the same MBGID (e.g., MBGID=1) would be placed into a common, discrete data packet (e.g., data packet 1). Referring to the FIG. 5 exemplary embodiment of the invention, the packetization engine 406 places the macroblocks into six data packets per QCIF frame. However, the packetization engine 406 may use more than one packet with a given MBGID to transport macroblocks with the given MBGID. For example, packetization engine 406 may create a first data packet 1 comprising a portion of the macroblocks with MBGID=1 and a second data packet 1 comprising a remainder of the macroblocks with MBGID=1. The splitting of the packets in this manner is typically governed by a maximum transfer unit size (MTU) associated with the network 206 (FIG. 2).

Subsequently, the data packets and picture header are forwarded to the communication buffer 408 for transmission across the network 206 (FIG. 2) by the communication interface 312 (FIG. 3). To further promote resilience against packet loss, the picture header may be transmitted more than once per frame. The picture header may include the intra-macroblock map.

Conversely, the image processing engine 310 also processes video data packets received from a remote location and provides video signals for display. Initially, video data packets are received by the communication interface 312 (FIG. 3), and forwarded to the communication buffer 408. The video data packets are then sent to the macroblock packetization engine 406, which unpacks the macroblocks. Next, the macroblock reordering engine 404 orders the macroblocks back into their original, ordered pattern (i.e., pattern prior to macroblock reordering at the remote video conference station 204, which is typically raster-scan (FIG. 2)).

Subsequently, the coding engine 402 functions as a decoder, and determines whether a video data packet was lost in transit across the network 206. FIG. 6 is a diagram of the QCIF frame macroblock reorder pattern of FIG. 5, when a data packet containing coded macroblock data for macroblocks with MBGID=5 is lost. The lost macroblocks are marked with an "x". It should be noted that the lost macroblocks are advantageously spatially distributed across the QCIF frame, according to one embodiment of the present invention, thus allowing for accurate, low complexity error concealment techniques employing such methods as spatial interpolation or motion vector estimation and compensation. Although FIG. 6 illustrates a single missing data packet for convenience of discussion, the scope of the present invention covers error concealment when any number of data packets are corrupted or lost during transit. It should further be noted that although the same components are described herein as being used for both transmission and receiving functions, the components may be embodied in separate receiver and transmitter devices.

Referring back to FIG. 4, for each lost macroblock, the coding engine 402 determines whether the lost macroblock is intra-coded or inter-coded. For example, the coding engine 402 may examine the intra-macroblock map to determine whether the lost macroblock is intra-coded. As mentioned above, the intra-macroblock map may be sent in picture header fields or as side information conveyed outside a video stream, and may be compressed using a run-length encoding algorithm, configured as a bitmap which identifies intra-coded macroblocks, or some other efficient coding method.

If the lost macroblocks are intra-coded, then several error concealment techniques may be utilized. For example, if the lost macroblock is intra-coded as part of a "walk-around-refresh" mechanism, the coding engine 402 replaces the lost macroblock with contents of a "corresponding" macroblock from a previous frame, where two "corresponding" macroblocks cover the same spatial area of their respective frames. According to the present invention, the "walk-around-refresh" mechanism's clean up rate is a function of the data and error rates.

Figure 7:
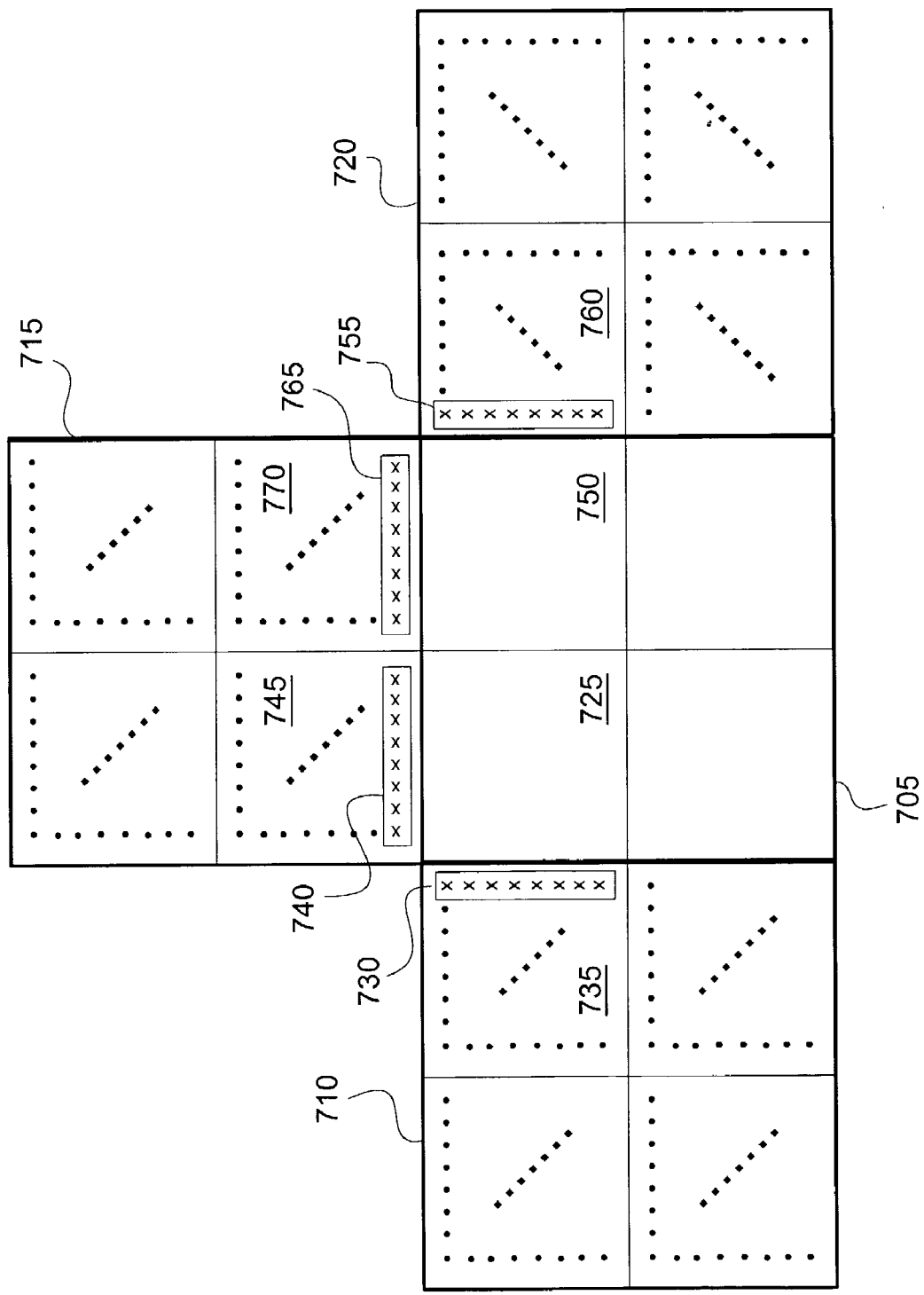
FIG. 7 is a block diagram of a two-dimensional interpolation scheme using data associated with pixels located in adjacent macroblocks, according to one embodiment of the present invention.

Alternatively, if a lost intra-coded macroblock is not coded as part of the "walk-around-refresh" mechanism, then the coding engine 402 spatially interpolates the contents of the lost macroblock from adjacent macroblocks. In one embodiment of the invention, each 8×8 block of the lost macroblock is spatially interpolated from the two nearest blocks located in adjacent macroblocks. FIG. 7 illustrates an exemplary interpolation scheme using data associated with pixels located in adjacent macroblocks. FIG. 7 includes a lost macroblock 705, a left adjacent macroblock 710, an upper adjacent macroblock 715, and a right adjacent macroblock 720. For example, to reconstruct (i.e., interpolate) data for an 8×8 upper left-hand block 725 of the lost 16×16 macroblock 705, the coding engine 402 (FIG. 4) interpolates data in a last column of data 730 (indicated by x's) from an 8×8 upper right-hand block 735 of the left adjacent macroblock 710, and data in a last row of data 740 (indicated by an x's) from an 8×8 lower left-hand block 745 of the upper adjacent macroblock 715.

Similarly, to reconstruct data for an 8×8 upper right-hand block 750 of the lost macroblock 705, the coding engine 402 interpolates data in a first column of data 755 from an 8×8 upper left-hand block 760 of the right adjacent macroblock 720, and data in a last row of data 765 from an 8×8 lower right-hand block 770 of the upper adjacent macroblock 715. Other forms of interpolation may also be applied and other blocks of adjacent macroblocks may be utilized, and are within the scope of the present invention.

Figure 8:
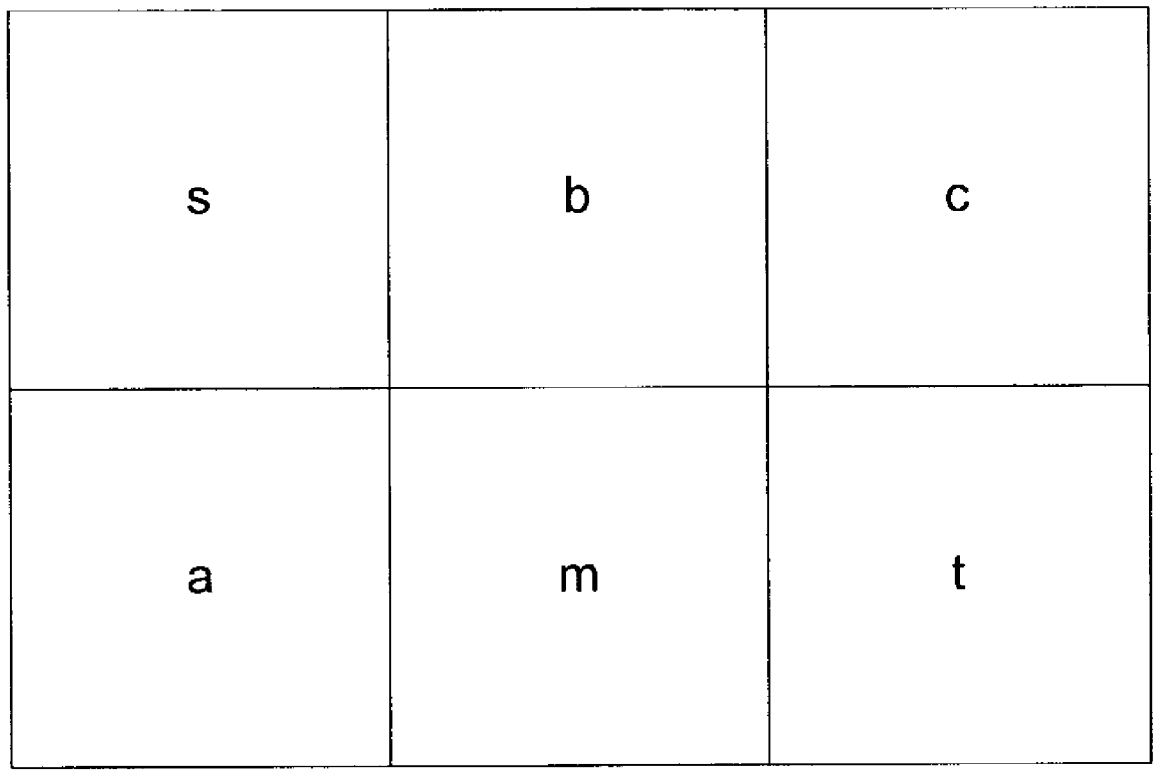
FIG. 8 is an exemplary block diagram of adjacent macroblocks used to estimate the motion vector of lost macroblock m, according to the present invention.

If the lost macroblock is inter-coded, then the coding engine 402 computes an estimate of the lost macroblock's motion vector by examining the motion vectors of adjacent macroblocks. FIG. 8 is a block diagram of adjacent macroblocks used to estimate the motion vector of lost macroblock m, according to one embodiment of the present invention. For the lost macroblock m, a median of motion vectors of three neighboring macroblocks a, b, and c is computed. For example, the x-component of estimated motion vector of macroblock m is $MV^m_x$=median ($MV^a_x$, $MV^b_x$, $MV^c_x$) and the y-component of estimated motion vector of macroblock m is $MV^m_y$=median ($MV^a_y$, $MV^b_y$, $MV^c_y$), where $MV^a_x$, $MV^b_x$, $MV^c_x$ are the x-components of motion vectors of macroblocks a, b, and c, respectively, and $MV^a_y$, $MV^b_y$, $MV^c_y$ are the y-components of motion vectors of macroblocks a, b, and c, respectively. Although the FIG. 8 embodiment of the invention uses motion vectors from adjacent macroblocks a, b, and c to compute an estimated motion vector for macroblock m, any number and any combination of adjacent macroblocks may be used to estimate a lost macroblock's motion vector.

Once the lost macroblock's motion vector is estimated, the coding engine 402 (FIG. 4) motion compensates the lost macroblock by using the estimated motion vector to rebuild the lost macroblock's data content. After the data content of all lost macroblocks of a given frame is rebuilt, the coding engine 402 transforms the macroblocks into a video signal for display on the display device 302 (FIG. 3). Although illustrated with only one lost data packet, the present invention may be utilized to conceal errors with multiple lost data packets.

Figure 9:
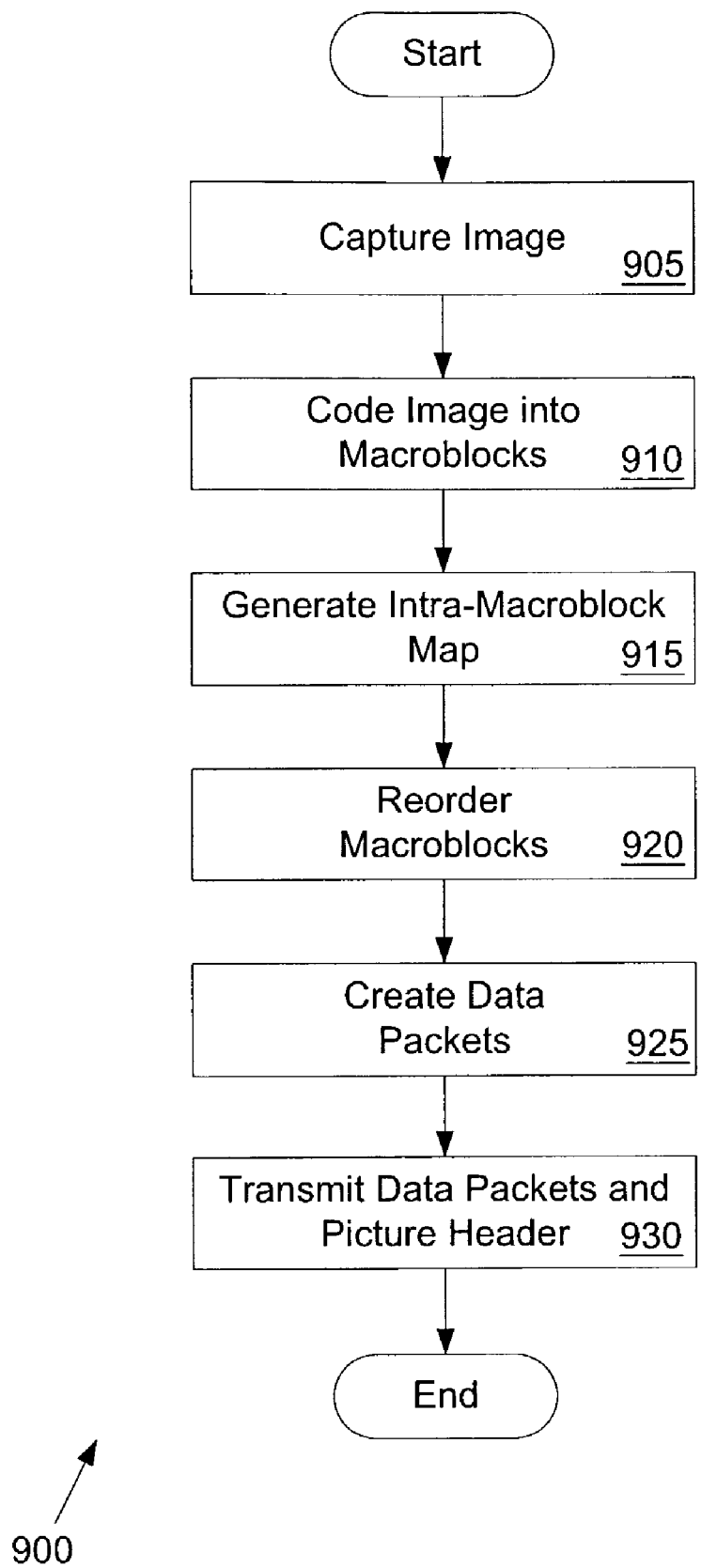
FIG. 9 is an exemplary flowchart of method steps for video data processing, according to one embodiment of the present invention.

FIG. 9 is an exemplary flowchart 900 of method steps for video error concealment when transmitting video data over packet switched networks, according to one embodiment of the present invention. In step 905, the video capture device 308 (FIG. 3) captures a video image and generates a video signal. Next, in step 910, the coding engine 402 (FIG. 4) (also referred to as an encoder when processing data for transmission) receives the video signal and transforms the video signal into one or more intra-coded and inter-coded macroblocks. A video frame may comprise inter-coded macroblocks, intra-coded macroblocks, or any combination of intra-coded and inter-coded macroblocks. In one embodiment of the invention, a "walk-around-refresh" mechanism is enabled to intra-code a pattern of macroblocks using a walk-around interval selected from a set of predetermined walk-around intervals. The walk-around interval may be selected based upon video data rates and error rates. In addition, the coding engine 402 computes a non-differentially encoded motion vector for each inter-coded macroblock.

Subsequently, in step 915, the coding engine 402 generates an intra-macroblock map that identifies locations of the intra-coded macroblocks. In one embodiment of the present invention, the intra-macroblock map is coded using either a run-length encoding method or a bitmap encoding method based upon total number of bits required to code the intra-macroblock map.

Next, a macroblock reordering engine 404 (FIG. 4) assigns each macroblock an MBGID in step 920. For example, the macroblocks may be assigned MBGIDs in a pattern such as that shown in FIG. 5. In one embodiment, the macroblocks are assigned so as to minimize adjacent macroblocks being assigned the same MBGIDs. Alternatively, other embodiments may contemplate assigning adjacent macroblocks the same MBGIDs.

Subsequently, the macroblock packetization engine 406 (FIG. 4) creates discrete data packets and places the macroblocks into the discrete data packets according to their MBGIDs in step 925. For example, macroblocks with the same MBGID would be placed into a common discrete data packet. Alternatively, the macroblock packetization engine 406 may be a transport engine for placing macroblocks into a particular format for transport on a circuit-switched network. Finally, in step 930, the data packets and a picture header (including the intra-macroblock map) are sent to the communication buffer 408 (FIG. 4) for transmission to the remote video conference station 204 (FIG. 2).

Figure 10:
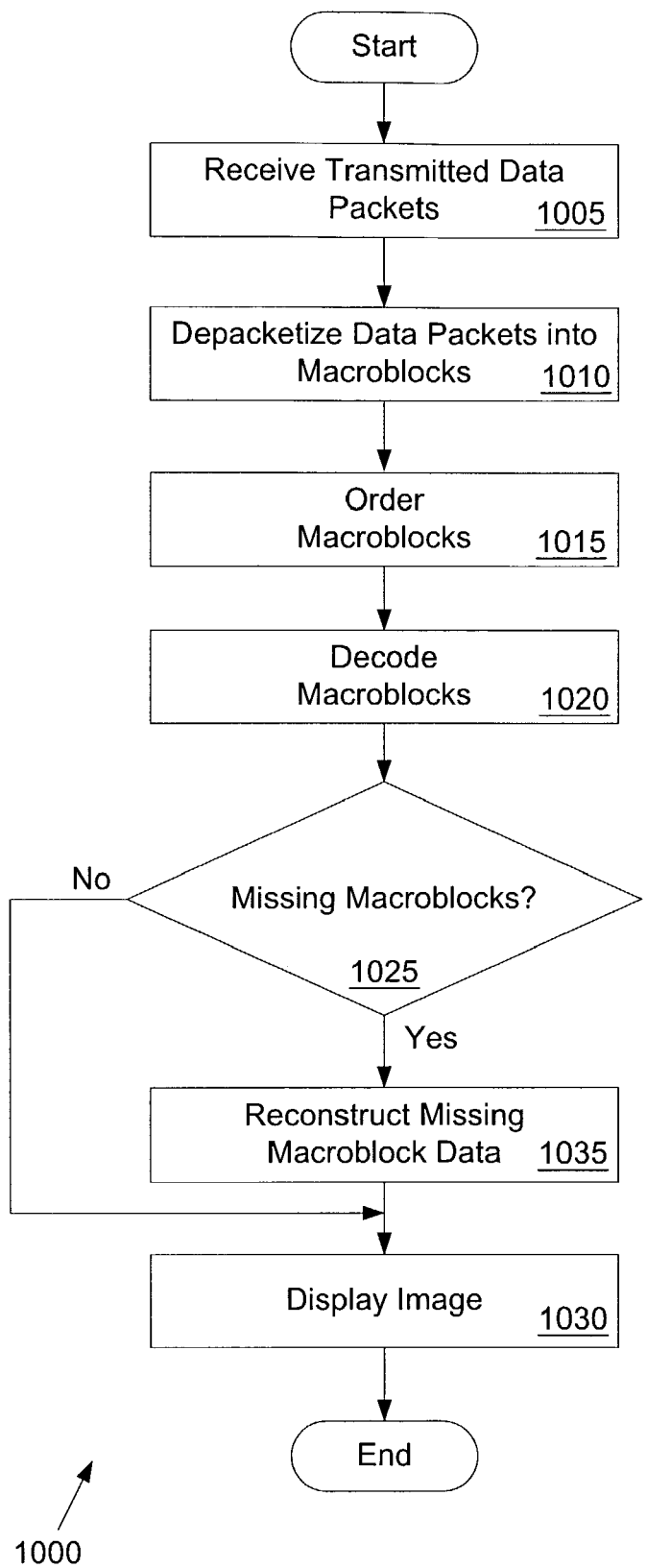
FIG. 10 is an exemplary flowchart of method steps for video error concealment when receiving video data, according to the present invention.

FIG. 10 is an exemplary flowchart 1000 of method steps for video error concealment when receiving video data, according to the present invention. In step 1005, the communication buffer 408 (FIG. 4) receives transmitted data packets from the remote video conference station 204 (FIG.

2) via the network 206 (FIG. 2). Then, in step 1010, the macroblock packetization engine 406 (FIG. 4) de-packetizes the received data packets into macroblocks. Subsequently in step 1015, the macroblock reordering engine 404 (FIG. 4) orders the macroblocks and places the macroblocks in proper spatial configuration within a video frame.

Next, the coding engine 402 (FIG. 4) decodes the macroblocks in step 1020. The coding engine 402 (functioning as a decoder) or some other mechanism related to a video data packet transform (e.g., RTP sequence numbers) determines if any macroblocks comprising the video frame are missing in step 1025. Macroblocks are lost if one or more video data packets are lost or corrupted via transmission of the video data packets over the network 206. If, in step 1025, it is determined that no macroblocks are missing, then the macroblocks are displayed by the display device 302 (FIG. 3) in step 1030. However, if in step 1025, it is determined that one or more macroblocks are missing, then the data associated with the one or more missing macroblocks are reconstructed, based on macroblock coding type, in step 1035. The coding engine 402 may use the intra-macroblock map to determine the coding type of each lost macroblock.

For example, if the lost macroblock is intra-coded as part of the "walk-around-refresh" mechanism, then the coding engine 402 replaces the lost macroblock's content with the data content of a corresponding macroblock from a previous frame. Alternatively, if a lost intra-coded macroblock is not coded as part of the "walk-around-refresh" mechanism, then the lost macroblock's content are spatially interpolated from nearest-neighbor adjacent macroblocks. In one embodiment of the present invention, the coding engine 402 uses a two-dimensional interpolation to interpolate data from adjacent macroblocks (FIG. 7).

Alternatively, if the lost macroblock is inter-coded, then the coding engine 402 estimates the lost macroblock's motion vector by examining the motion vectors of adjacent macroblocks. In one embodiment of the invention, the motion vector is computed as a median of three neighboring macroblocks' motion vectors (FIG. 8). The coding engine 402 then uses the estimated motion vector to compensate for the data content of the lost macroblock by reconstructing an estimate of the lost macroblock's data content. Once the data contents of the missing macroblocks have been reconstructed, the macroblocks are displayed by the display device 302, in step 1025.

The invention has been explained above with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A system for processing video data, comprising:
   a coding engine for processing each frame of a video signal to generate macroblocks and to encode the macroblocks;
   a macroblock reordering engine for assigning a macroblock group identifier (MBGID) from a plurality of MBGIDs to each encoded macroblock; and
   a macroblock packetization engine for placing each of the encoded macroblocks into a particular data packet according to the MBGID, such that each packet contains only macroblocks having a common MBGID.

2. The system of claim 1, wherein the macroblock reordering engine assigns a different MBGID to adjacent encoded macroblocks.

3. The system of claim 1, wherein the coding engine generates non-differentially encoded motion vectors for each of the encoded macroblocks which is an inter-coded macroblock.

4. The system of claim 1, wherein the macroblock packetization engine places the encoded macroblocks with different assigned MBGIDs into different data packets.

5. The system of claim 1, wherein the MBGID has a value from 1 to a maximum group identifier (MGID).

6. The system of claim 5, wherein the macroblock reordering engine determines the MGID based on video data rates.

7. The system of claim 5, wherein the macroblock reordering engine determines the MGID based on video format.

8. The system of claim 1, wherein the coding engine encodes a given macroblock of a current frame as an intra-coded macroblock if significant differences exist between data of the given macroblock of the current frame and data of a closest matching offset macroblock of a previous frame.

9. The system of claim 1, wherein the coding engine encodes a given macroblock of a current frame as an inter-coded macroblock if significant similarities exist between data of the given macroblock of the current frame and data of a closest matching offset macroblock of a previous frame.

10. The system of claim 1, wherein the coding engine further generates an intra-macroblock map identifying intra-coded macroblocks in a given frame.

11. The system of claim 10, wherein the coding engine encodes the intra-macroblock map by selecting an intra-macroblock map encoding method that generates a fewest number of bits.

12. The system of claim 10, wherein the coding engine uses run-length encoding to encode the intra-macroblock map.

13. The system of claim 10, wherein the coding engine uses a bitmap to encode the intra-macroblock map.

14. The system of claim 1, wherein the macroblock packetization engine of a receiving device de-packetizes the encoded macroblocks.

15. The system of claim 1, wherein the macroblock reordering engine of a receiving device orders the encoded macroblocks.

16. The system of claim 1, wherein the coding engine of a receiving device decodes the encoded macroblocks and detects missing decoded macroblocks.

17. The system of claim 16, wherein the coding engine of the receiving device spatially interpolates data of a given missing decoded macroblock from data of adjacent decoded macroblocks for concealing effects of video error, if the given missing decoded macroblock was encoded as an intra-coded macroblock.

18. The system of claim 16, wherein the coding engine of the receiving device estimates a motion vector of a given missing decoded macroblock based on motion vectors of adjacent decoded macroblocks to reconstruct data content of the given missing decoded macroblock via motion compensation for concealing effects of video error, if the given missing decoded macroblock was encoded as an inter-coded macroblock.

19. The system of claim 1, wherein the macroblock packetization engine is a transport engine for placing each of the encoded macroblocks according to the MBGID into a particular format for transport on a circuit-switched network.

20. A method for processing video data, comprising the steps of:
processing each frame of a video signal to generate macroblocks; encoding the macroblocks;
assigning a macroblock group identifier (MBGID) from a plurality of MBGIDs to each encoded macroblock;
reordering the encoded macroblocks according to the MBGID; and
placing each of the encoded macroblocks into a particular data packet, such that each packet contains only macroblocks having a common MBGID.

21. The method of claim 20, wherein the step of assigning further comprises the step of assigning adjacent encoded macroblocks a different MBGID.

22. The method of claim 20, further comprising the step of generating non-differentially encoded motion vectors for each of the encoded macroblocks which is an inter-coded macroblock.

23. The method of claim 20, wherein the step of placing further comprises the step of placing the encoded macroblocks with different assigned MBGIDs into different data packets.

24. The method of claim 20, wherein the MBGID has a value from 1 to a maximum group identifier (MGID).

25. The method of claim 23, further comprising the step of determining the MGID based on video data rates.

26. The method of claim 23, further comprising the step of determining the MGID based on video format.

27. The method of claim 20, wherein the step of encoding further comprises the step of encoding a given macroblock of a current frame as an intra-coded macroblock if significant differences exist between data of the given macroblock of the current frame and data of a closest matching offset macroblock of a previous frame.

28. The method of claim 20, wherein the step of encoding further comprises the step of encoding a given macroblock of a current frame as an inter-coded macroblock if significant similarities exist between data of the given macroblock of the current frame and data of a closet matching offset macroblock of a previous frame.

29. The method of claim 20, further comprising the step of generating an intra-macroblock map identifying intra-coded macroblocks in a given frame.

30. The method of claim 29, further comprising the step of selecting an intra-macroblock map encoding method that generates a fewest number of bits.

31. The method of claim 29, further comprising the step of using run-length encoding to encode the intra-macroblock map.

32. The method of claim 29, further comprising the step of using a bitmap to encode the intra-macroblock map.

33. The method of claim 20, further comprising the step of de-packetizing the encoded macroblocks.

34. The method of claim 20, further comprising the step of ordering the encoded macroblocks.

35. The method of claim 20, further comprising the steps of decoding the encoded macroblocks and detecting missing decoded macroblocks.

36. The method of claim 35, further comprising the step of spatially interpolating data of a given missing decoded macroblock from data of adjacent decoded macroblocks for concealing effects of video error, if the given missing decoded macroblock was encoded as an intra-coded macroblock.

37. The method of claim 35, further comprising the step of estimating a motion vector of a given missing decoded macroblock based on motion vectors of adjacent decoded macroblocks to reconstruct data content of the given missing decoded macroblock via motion compensation for concealing effects of video error, if the given missing decoded macroblock was encoded as an inter-coded macroblock.

38. The method of 20, wherein the step of placing further comprises placing each of the encoded macroblocks according to the MBGID into a particular format for transport on circuit-switched network.

39. A computer-readable medium encoded with a computer program, when executed by a computer, to perform a method for processing video data, the method comprising:
processing each frame of a video signal to generate macroblocks;
encoding the macroblocks;
assigning a macroblock group identifier (MBGID) from a plurality of MBGIDs to each encoded macroblock;
reordering the encoded macroblocks according to the MBGID; and placing each of the reordered macroblocks into a particular data packet, such that each packet contains only macroblocks having a common MBGID.

40. The computer-readable medium of claim 39, the method further comprising assigning adjacent encoded macroblocks a different MBGID.

41. The computer readable medium of claim 39, the method further comprising generating non-differentially encoded motion vectors for each of the encoded macroblocks which is an inter-coded macroblock.

42. The computer readable medium of claim 39, wherein placing further comprises placing the encoded macroblocks with different assigned MBGIDs into different data packets.

43. The computer readable medium of claim 39, wherein encoding further comprises encoding a given macroblock of a current frame as an intra-coded macroblock if significant differences exist between data of the given macroblock of the current frame and data of a closest matching offset macroblock of a previous frame.

44. The computer readable medium of claim 39, wherein encoding further comprises encoding a given macroblock of a current frame as an inter-coded macroblock if significant similarities exist between data of the given macroblock of the current frame and data of a closest matching offset macroblock of a previous frame.

45. The computer readable medium of claim 39, the method further comprising generating an intra-macroblock map identifying intra-coded macroblocks in a given frame.

46. A method for processing video data, comprising the steps of:
generating macroblocks for each frame of a video signal;
encoding the macroblocks;
assigning a macroblock group identifier (MBGID) from a plurality of MBGIDs to each encoded macroblock;
reordering the encoded macroblocks according to the MBGID;
placing the reordered macroblocks into different data packets, such that each packet contains only macroblocks having a common MBGID;
transmitting the different data packets to a remote device;

decoding the encoded macroblocks of the different data packets received at the remote device;

detecting missing decoded macroblocks; and reconstructing data of the missing decoded macroblocks.

47. The method of claim 46, wherein the step of reconstructing data further comprises the step of spatially interpolating data of a given missing decoded macroblock from data of adjacent decoded macroblocks for concealing effects of video error, if the given missing decoded macroblock was encoded as an intra-coded macroblock.

48. The method of claim 46, wherein the step of reconstructing data further comprises the step of estimating a motion vector of a given missing decoded macroblock based on motion vectors of adjacent decoded macroblocks to reconstruct data content of the given missing decoded macroblock via motion compensation for concealing effects of video error, if the given missing decoded macroblock was encoded as an inter-coded macroblock.

49. A system for processing video data, comprising:

means for processing each frame of a video signal to generate macroblocks;

means for encoding the macroblocks;

means for assigning a macroblock group identifier (MBGID) from a plurality of MBGIDs to each encoded macroblock;

means for reordering the encoded macroblocks according to the MBGID; and means for placing each of the reordered macroblocks into a particular data packet, such that each packet contains only macroblocks having a common MBGID.

50. A system for processing video data, comprising:

a macroblock de-packetization engine for receiving a plurality of data packets, each packet containing a plurality of macroblocks wherein each of the plurality of macroblocks in a given packet has a common macroblock group identifier (MBGID);

a macroblock reordering engine for reordering the received macroblocks from the plurality of data packets into a predetermined order; and a decoding engine for processing the reordered macroblocks to generate a video signal.

51. The system of claim 50, wherein the predetermined order is a raster scan order.

52. The system of claim 50, wherein the plurality of data packets include non-differentially encoded motion vectors for each of the encoded macroblocks that is an inter-coded macroblock 53. The system of claim 50, wherein different data packets contain macroblocks with different assigned MBGIDs.

54. The system of claim 1, wherein the MBGIDs range in value from 1 to a maximum group identifier (MGID).

55. The system of claim 54, wherein MGID corresponds to a video data rate.

56. The system of claim 54, wherein the MGID corresponds to a video format.

57. The system of claim 50, wherein the plurality of data packets includes an intra-macroblock map identifying intra-coded macroblocks in a given frame.

58. The system of claim 57, wherein the intra-macroblock map is encoded using run-length encoding.

59. The system of claim 57, wherein the intra-macroblock map is encoded using a bitmap.

60. The system of claim 57 wherein the decoding engine detects whether the intra-macroblock map is encoded using run-length coding or a bitmap and processes the macroblocks accordingly.

61. The system of claim 50, wherein the decoding engine detects macroblocks missing from the reordered macroblocks.

62. The system of claim 61, wherein the decoding engine spatially interpolates data of a given missing macroblock from data of adjacent decoded macroblocks, if the given missing macroblock was encoded as an intra-coded macroblock.

63. The system of claim 61, wherein the decoding engine estimates a motion vector of a given missing macroblock based on motion vectors of adjacent decoded macroblocks to reconstruct data content of the given missing macroblock via motion compensation, if the given missing decoded macroblock was encoded as an inter-coded macroblock.

64. A method for processing video data, comprising the steps of:

receiving a plurality of data packets, each data packet containing a plurality of macroblocks, each macroblock within a particular packet having a common macroblock group identifier (MBGID);

de-packetizing the encoded macroblocks;

reordering the received macroblocks into a predetermined order different from the order in which they were received; and decoding the reordered macroblocks to produce a video signal.

65. The method of claim 64, wherein the predetermined order is a raster scan order 66. The method of claim 64, wherein the plurality of data packets contains non-differentially encoded motion vectors for each of the encoded macroblocks which is an inter-coded macroblock.

67. The method of claim 64, wherein different data packets contain macroblocks with different assigned MBGIDs.

68. The method of claim 64, wherein the MBGIDs range in value from 1 to a maximum group identifier (MGID).

69. The method of claim 68, wherein the MGID corresponds to a video data rate.

70. The method of claim 68, wherein the MGID corresponds to a video format.

71. The method of claim 64, wherein the plurality of data packets contains an intra-macroblock map identifying intra-coded macroblocks in a given frame.

72. The method of claim 71, wherein the intra-macroblock map is run-length encoded.

73. The method of claim 71, wherein the intra-macroblock map is encoded using a bitmap.

74. The method of claim 64, further comprising the step of detecting missing macroblocks.

75. The method of claim 74, further comprising the step of spatially interpolating data of a given missing macroblock from data of adjacent decoded macroblocks, if the given missing macroblock was encoded as an intra-coded macroblock.

76. The method of claim 74, further comprising the step of estimating a motion vector of a given missing macroblock based on motion vectors of adjacent macroblocks to reconstruct data content of the given missing macroblock via motion compensation, if the given missing macroblock was encoded as an inter-coded macroblock.

77. A computer-readable medium encoded with a computer program, when executed by a computer, to perform a method for processing video data, the method comprising:

receiving a plurality of data packets, each data packet containing a plurality of macroblocks, each macroblock within a particular data packet having a common macroblock group identifier (MBGID);

de-packetizing the encoded macroblocks;

reordering the received macroblocks into a predetermined order different from the order in which they were received; and decoding the reordered macroblocks to produce a video signal.

78. The computer-readable medium of claim 77, wherein the predetermined order is a raster scan order 79. The computer-readable medium of claim 77, wherein the plurality of data packets contains non-differentially encoded motion vectors for each of the encoded macroblocks which is an inter-coded macroblock.

80. The computer-readable medium of claim 77, wherein different data packets contain macroblocks with different assigned MBGIDs.

81. The computer-readable medium of claim 77, wherein the MBGIDs range in value from 1 to a maximum group identifier (MGID).

82. The computer-readable medium of claim 81, wherein the MGID corresponds to a video data rate.

83. The computer-readable medium of claim 81, wherein the MGID corresponds to a video format.

84. The computer-readable medium of claim 77, wherein the plurality of data packets contains an intra-macroblock map identifying intra-coded macroblocks in a given frame.

85. The computer-readable medium of claim 84, wherein the intra-macroblock map is run-length encoded.

86. The computer-readable medium of claim 84, wherein the intra-macroblock map is encoded using a bitmap.

87. The computer-readable medium of claim 77, the method further comprising detecting missing macroblocks.

88. The computer-readable medium of claim 87, to the method further comprising spatially interpolating data of a given missing macroblock from data of adjacent decoded macroblocks, if the given missing macroblock was encoded as an intra-coded macroblock.

89. The computer-readable medium of claim 87, the method further comprising estimating a motion vector of a given missing macroblock based on motion vectors of adjacent macroblocks to reconstruct data content of the given missing macroblock via motion compensation, if the given missing macroblock was encoded as an inter-coded macroblock.

* * * * *

UNITED STATES PATENT AND TRADEMARK OFFICE
CERTIFICATE OF CORRECTION

| | | |
|---|---|---|
| PATENT NO. | : 7,239,662 B2 | Page 1 of 1 |
| APPLICATION NO. | : 10/226504 | |
| DATED | : July 3, 2007 | |
| INVENTOR(S) | : Michael Horowitz and Rick Flott | |

It is certified that error appears in the above-identified patent and that said Letters Patent is hereby corrected as shown below:

In column 13, claim 28, line 48:

"closet" is changed to --closest--

Signed and Sealed this

Fourteenth Day of August, 2007

JON W. DUDAS
*Director of the United States Patent and Trademark Office*